April 22, 1930. W. A. RICE 1,755,747
METHOD OF AND APPARATUS FOR SEPARATING SEEDS
Filed July 26, 1928

INVENTOR:
WILLIAM A. RICE.
BY W. L. Dempsey,
ATTORNEY.

Patented Apr. 22, 1930

1,755,747

UNITED STATES PATENT OFFICE

WILLIAM A. RICE, OF JERSEYVILLE, ILLINOIS

METHOD OF AND APPARATUS FOR SEPARATING SEEDS

Application filed July 26, 1928. Serial No. 295,433.

This invention relates to a process of and mechanism for separating and cleaning seeds, and more particularly to a process and mechanism for separating seeds that do not become mucilaginous when moistened from seeds that do become mucilaginous when moistened.

The principal object of this invention is to improve the process and apparatus for separating seeds disclosed in my U. S. Patent No. 1,411,519, issued April 4th, 1922, whereby the efficiency of the process and apparatus above referred to is increased more than 200%.

The process will be more fully understood as the mechanism for carrying it out is described. In the drawings.

In order to more thoroughly understand my process and mechanism, it is necessary to understand the class of seeds for which it is intended, and the difficulties involved in separating the same.

My process and mechanism is especially designed for separating clover seeds from "buck's horn" seed, known in the trade as "buckhorn", which is a species under the Lobelia family, and also referred to as plantain.

Clover seed has a smooth surface which is adapted to shed water and may be said to be impervious to moisture unless exposed thereto for a considerable time, while buckhorn seed rapidly absorbs moisture and rapidly expands with absorption. Buckhorn seeds being very prolific and hardy crowd out other vegetation wherever they fall and vegetate. For this reason it is very important that clover seed be as nearly free from it as possible.

Because of its size and light weight, it has been found impossible to separate clover seed and buckhorn in the ordinary screens and fan mills. It has, however, been found practical to remove it by screening when the buckhorn has been expanded by moisture. But, since the buckhorn is intimately mixed with the clover seed as it comes from a threshing machine, it is necessary to moisten both the clover seed and the buckhorn; in other words, moisten the whole mixture before it can be separated.

Since the buckhorn is of no value, and the clover seed deteriorates or rots if not immediately dried, it becomes necessary to dry the clover seeds after first moistening it. Formerly this has been done by the application of heat, which requires considerable time, and there is also the danger of overheating the seeds.

In my former patent above referred to, I depended upon the buckhorn seeds absorbing the moisture from the clover seed by continuously agitating the mixture of seeds, and while this method accomplished the purpose for which it was intended, it required so long a time to do so that the process and mechanism was not commercially successful.

The present invention, which has increased the output of a given size machine more than 200%, consists in passing the moistened seed mixture through a current of air of relatively high velocity and great volume, in addition to the other steps set forth in said patent above referred to.

Figure 1:
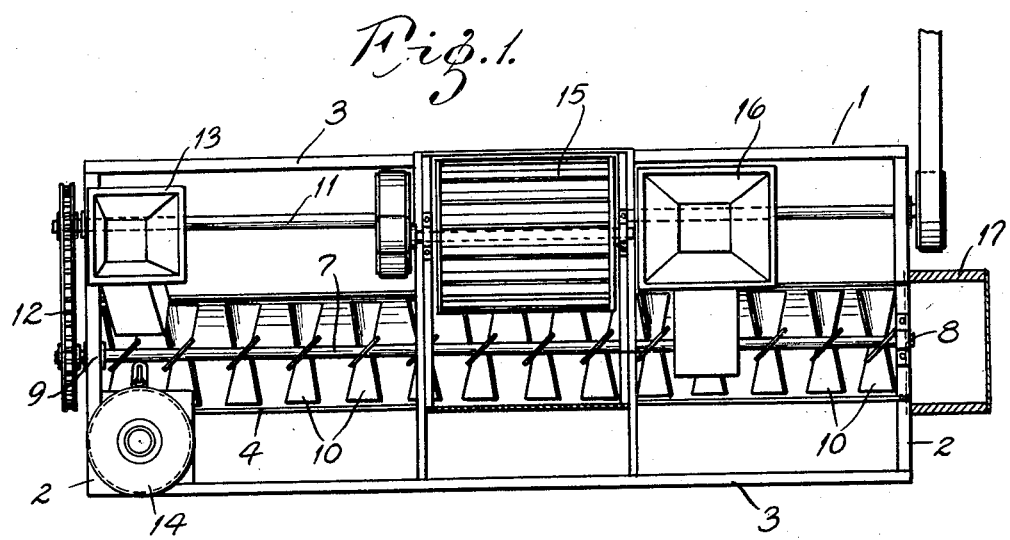
Fig. 1 is a plan view of my preferred mechanism for carrying my process into effect.
Figure 2:
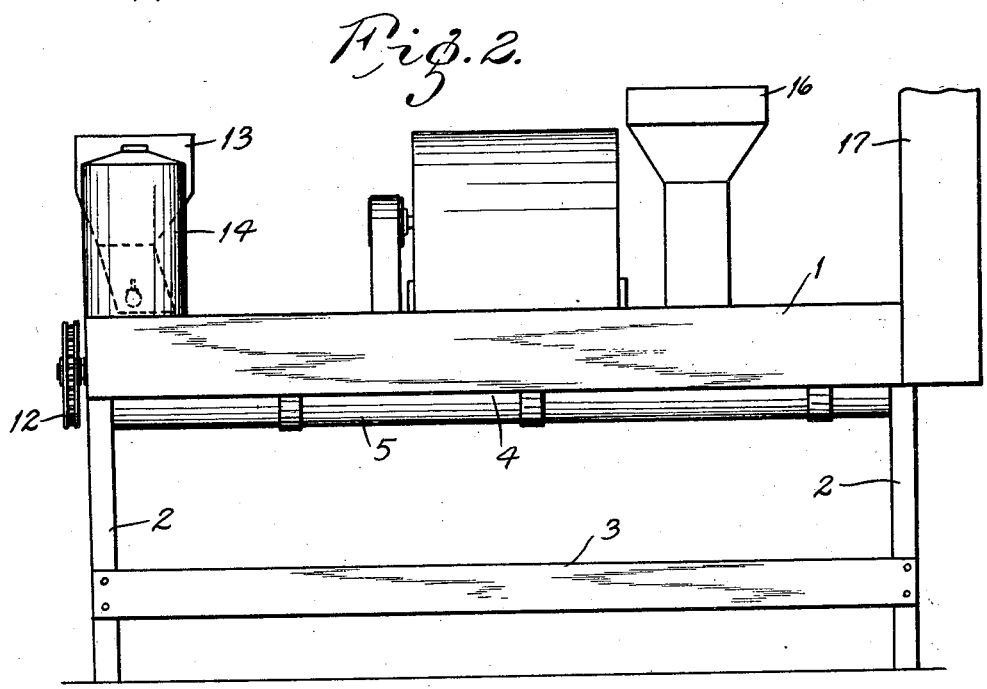
Fig. 2 is a side elevation of my preferred mechanism.
Figure 3:
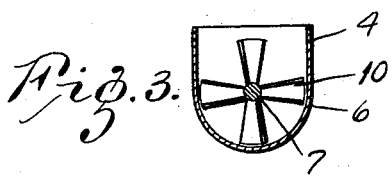
Fig. 3 is a cross section of the agitator and conveyor.

The mechanism for carrying out my process consists of a supporting framework 1 suitably mounted upon legs 2 held in place at their lower ends by a cross brace 3. Superimposed on the framework 1 and positioned longitudinally thereon is an open trough 4 having a bottom 5 semi-circular in cross-section as indicated at 6, in Fig. 2.

A rotatable shaft 7 is longitudinally disposed in the trough 4 and suitably journalled at each end as indicated at 8 and 9. Disposed at equal distances throughout the length of the shaft 7 and attached thereto, and extending radially outward therefrom, are a plurality of fans 10, the curvature of which is such as to cause the seed to be conveyed from one fan to another, thus the seeds are conveyed from one end of the trough to the other.

The line shaft 11 rotatably mounted in the framework 1, parallel with the rotatable shaft 7, transmits rotary motion by means of a suitable belt or sprocket chain 12. A hopper 13 is provided which delivers the mixed seeds to one end of the rotary conveyor made up of the shaft 7 and paddles 10.

A water tank 14 located adjacent the hopper 13 delivers a regulated amount of water to the seeds as they flow from the hopper. The paddles 10 rotate constantly thus agitating the seeds as they are being conveyed from one end of the trough to the opposite end thereof.

After the seeds have been thoroughly mixed so that the moisture has had time to penetrate the buckhorn sufficiently, the paddle conveyor passes the seeds beneath a rotary radial blade fan 15, which delivers air to the seeds while being agitated thus completely and effectively removing the moisture from the surface of the clover seeds.

As the seeds are conveyed further towards the opposite end of the conveyor, a hopper 16 delivers fine, dry sawdust to the seed and conveyor, which thoroughly mixes the seeds and sawdust, effectively absorbing whatever moisture may still adhere to the clover seeds.

The conveyor continues all the while to agitate the mixture and then delivers it to a suitable receptacle 17 from which it may be withdrawn and further separated by the use of ordinary sieves and fan mills.

By introducing the drying fan between the point where the seeds are moistened and where the sawdust is mixed with the seed, I have been able to increase the capacity of a given size machine more than 200%, so that it has already reached large commercial application.

Having fully described my method and the mechanism for carrying same into effect, what I claim as new and useful and desire to protect by Letters Patent is:

1. The herein described process of separating seeds which become mucilaginous when moistened from seeds which do not become mucilaginous when moistened, which consists in agitating said seed mixture and applying water to moisten said mixture while said seed mixture is in a state of agitation, then conveying said seed mixture while in a state of agitation through a blast of air thereby to remove the moisture from the seeds which do not become mucilaginous when moistened, introducing dry sawdust into said seed mixture while still being agitated, then separating the seeds and sawdust in the usual way by means of screens and fans.

2. A seed separating mechanism of the class described, comprising a supporting frame, a conveyor trough mounted upon said frame, means for delivering a mixture of seeds to said trough, means for delivering a regulated amount of water to said seeds in said trough, means for agitating and mixing said seeds and said water, means for delivering a blast of air into said moistened seeds, means for conveying said moistened seeds throughout the length of said trough, means for delivering dry sawdust into said trough, means for mixing said sawdust with said seeds, and means for discharging the mixture of seeds and sawdust from said trough.

In witness whereof I have hereunto affixed my signature this 22nd day of June, 1928.

WILLIAM A. RICE.